A. B. COX.
RANGE FINDER.
APPLICATION FILED FEB. 24, 1917.
1,273,152.
Patented July 23, 1918.
2 SHEETS—SHEET 1.
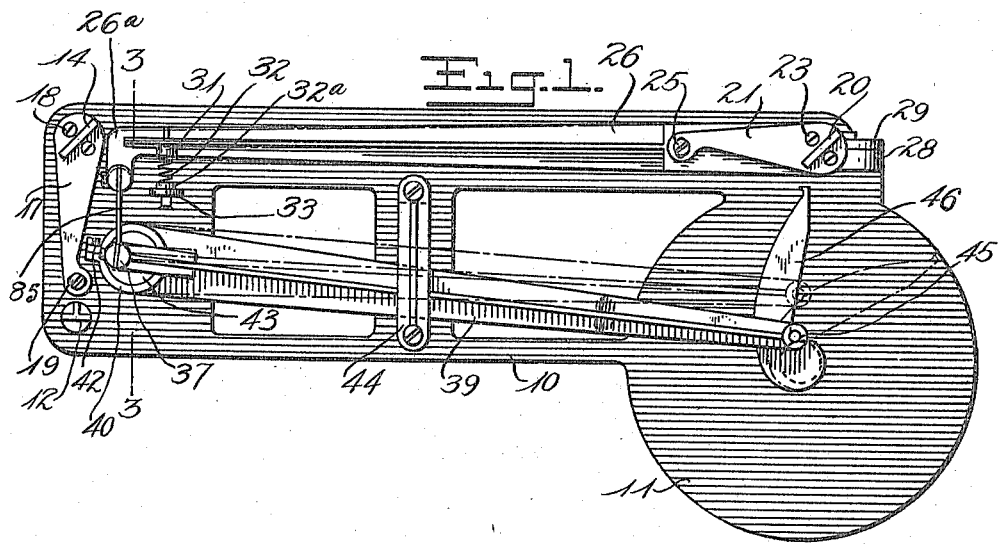
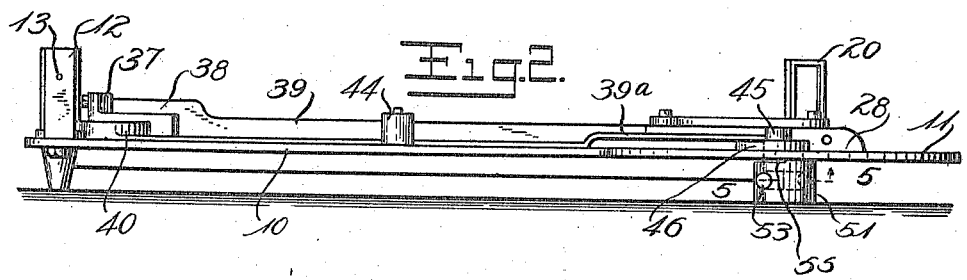
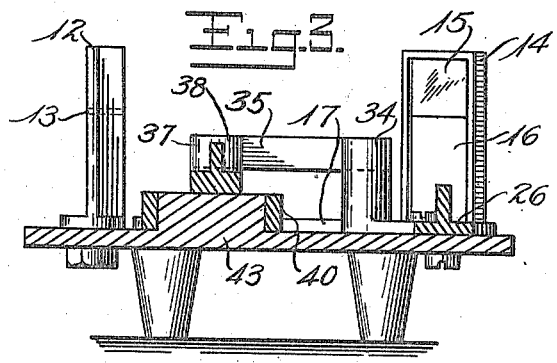
Abraham B. Cox, Inventor.
By his Attorney,
W. P. Hutchinson.

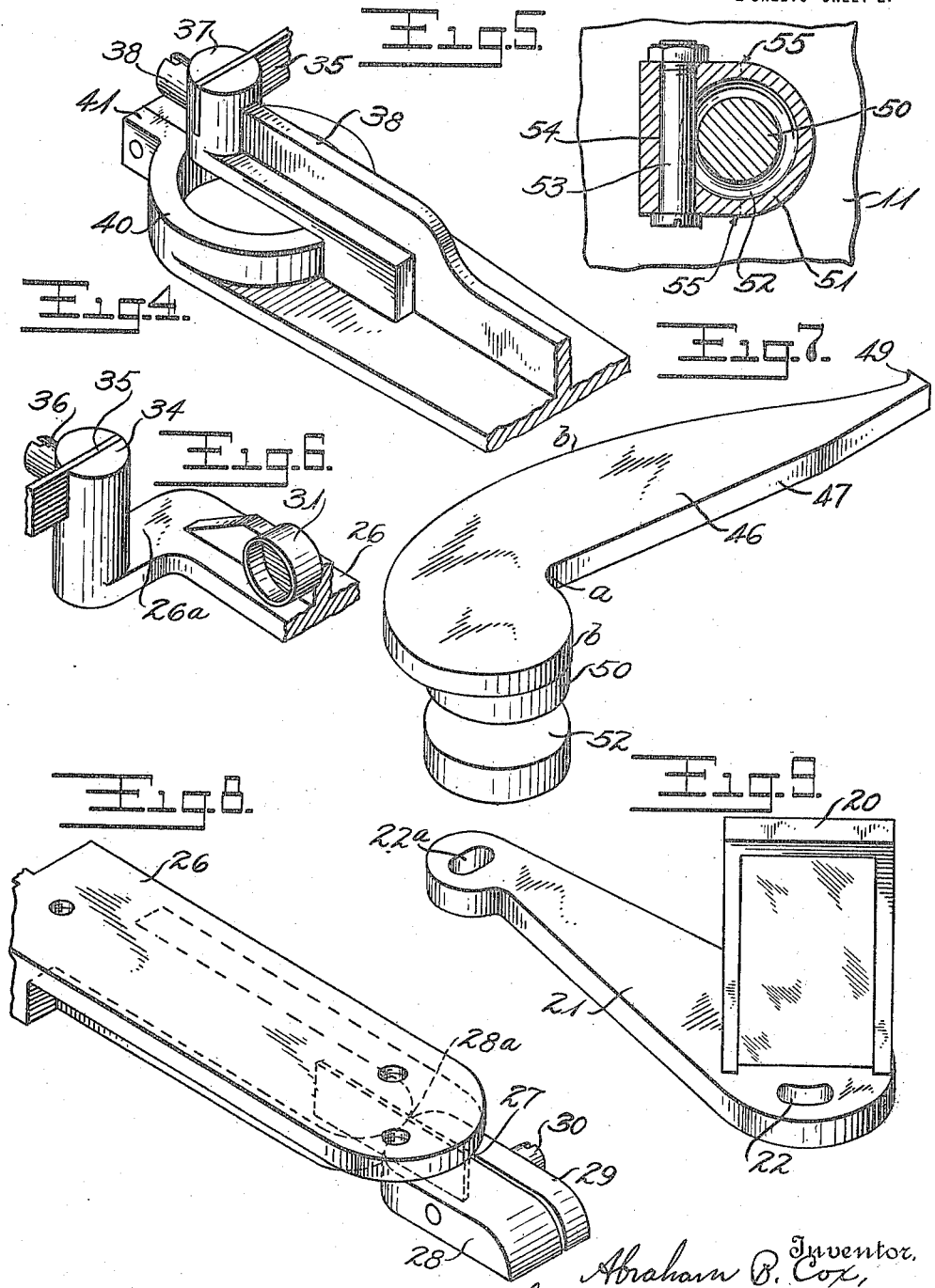

UNITED STATES PATENT OFFICE.

ABRAHAM B. COX, OF NEW YORK, N. Y.

RANGE-FINDER.

1,273,152.   Specification of Letters Patent.   Patented July 23, 1918.

Application filed February 24, 1917. Serial No. 150,696.

*To all whom it may concern:*

Be it known that I, ABRAHAM B. COX, a citizen of the United States, and a resident of the city, county, and State of New York, have invented a new and useful Improvement in Range-Finders, of which the following is a full, clear, and exact description.

My invention relates to improvements in range finders, and the object of my invention is generally to produce an unusually simple, efficient and easy and quickly operated range finder which will give an accurate estimate of the distance between objects. More especially my invention relates to a portable range finder which is well adapted for use of infantry, engineers, or others who desire to find a range between objects of comparatively short distances apart quickly and accurately. My invention is intended to produce an apparatus of this kind which is of simple substantial character so that it can stand rough usage, and in fact construct it in such a manner that if some of the parts become bent or distorted, the parts can be straightened out again and the apparatus used. While the invention is particularly adapted for the purposes stated, it can also be made on a larger scale, and for naval or marine work, and for longer ranges.

In carrying out my invention I use a fixed mirror similar to that of a sextant, having the lower portion clouded and the upper portion clear, which is arranged opposite a sight or peep hole, and at an angle to an opaque reflecting mirror which is adjustable, and the second mirror is actuated by a cam arm and connections between the cam arm and the second mirror, so that when the cam arm is moved, the second mirror can be adjusted until the reflection from it upon the first mirror causes the image to coincide with the object as viewed through the sight of the instrument, at which point the cam arm will indicate on a scale adjacent to it the distance between the object viewed and the observer. My invention is also intended to provide a simple and accurate connection between the movable mirror and the cam arm so that there will be no slack or lost motion, but an accurate transmission of movement. It will be seen that the line between the two mirrors will serve as the base line of a triangle, the line from the sight through the first mirror will be the altitude of the triangle, and the line from the object viewed to the second mirror will form the hypotenuse of the triangle, and so when the reflected image and the object directly viewed coincide, the distances can be essentially determined and indicated by the cam arm, which of course must be properly adjusted and accurately made for the purpose, all of which will appear clearly from the description which follows.

Reference is to be had to the accompanying drawings forming a part of this specification, in which similar reference characters indicate corresponding parts in all the views.

Figure 1 is a plan view of the apparatus embodying my invention.

Fig. 2 is a side elevation of the same.

Fig. 3 is a cross section on the line 3—3 of Fig. 1.

Fig. 4 is a broken enlarged detail perspective of a part of the link which connects with the cross arm.

Fig. 5 is a detail section on the line 5—5 of Fig. 2.

Fig. 6 is a broken perspective detail of a part of one of the operating levers.

Fig. 7 is an enlarged detail perspective of the cam arm.

Fig. 8 is a broken detail perspective of one of the joints of the machine, and

Fig. 9 is a perspective of one of the mirrors and its support.

The machine is provided with a flat table or base 10 which stands on suitable short supports, and at one end is preferably formed into a round table 11 on which a scale may be placed if desired. Near one end of the machine and preferably near the front edge is erected a sight 12 having a peep-hole 13 therethrough substantially like the common form of gun sight. Obviously other types of sight can be used without affecting the invention. Alining with the sight is a mirror 14 somewhat like the mirror of a sextant, which is placed at an angle to the sight, and having its upper surface clear as shown at 15 and its lower surface opaque as shown at 16. This mirror is adjusted permanently, but to provide for nicely fixing its position it is secured to a flat bracket 17 which lies on the table top, and which is held by screws 18 and 19 at the ends, the screw holes being elongated in a common manner and as shown in a similar detail at 22 in Fig. 9, so that the desired angle of the mirror 14 is procured and the bracket 17 then firmly fastened.

The mirror 14 is placed so as to receive reflections from an opaque mirror 20 at the opposite end of the machine, and this is secured on a bracket 21 similar to the bracket 17, and having screw holes 22 and 22$^a$ (see Fig. 9) to receive the fastening screws 23 and 25. This mirror 20 is thus secured to a lever 26 which lies flatwise on the machine, and has a hinge joint at one end as shown best in Fig. 8. To provide against any slack or lost motion, and for a very accurate movement of the lever 26 I make the joint in the following manner. The lever is split near one end to receive the leaf or flat spring 27 which is held also between the members 28 and 29, these being clamped together by a screw 30, and where the members 28 and 29 abut with the end of the lever 26, the parts are rounded off as shown at 28$^a$ in Fig. 8, so that the lever 26 can turn on its hinge, but the movement will be slight and will result from the slight bending of the member 27. Near its free end the lever 26 has an abutment 31 preferably in the shape of a cup which receives one end of the spiral spring 32, the opposite end of the spring entering a similar cup 32$^a$ on an abutment 33 which is rigid on the base 10. Thus the lever 26 has its slight movement against the tension of the spring 32.

At its free end the lever 26 is offset as shown at 26$^a$ and terminates in an upright post 34 (see Fig. 6) which is split to receive the flat spring 35, and this is bound by a clamping screw 36. The spring 35 forms a connection with the split post 37 which rides on the reduced and raised end 38 of the arm 39. The arm 39 has a bearing ring or journal 40 split at one side as shown at 41, and these parts fasten together by a screw 42, this journal riding on a stud 43 (see Fig. 3) which rises from the base 10. This arrangement makes a very firm and steady bearing for the arm. It will be noticed that the end 38 of the arm projects beyond the center of the journal 40 and stud 43 so as to make the connection with the post 37 an eccentric one, and thus the tilting of the arm 39 will cause a movement of the spring 36 and the lever 26 with which connection is made.

The arm 39 moves beneath a keeper 44 on the base 10, and at its free end the arm is undercut as shown at 39$^a$ and provided with a pin 45 which rides on the cam arm, that is in contact with one edge of the cam arm 46. The cam arm is made to turn on the table 11, and the latter should be provided with a scale of distances so that the cam arm will also serve as an indicator. The cam arm is essentially straight on one edge as shown at 47, and when the pin 45 is at the inner end of the straight edge, that is at the point $a$, the instrument is set at its maximum distance. The cam surface $b$ extends from the point $a$ around one edge and nearly the entire length of the arm, and at its end the arm has a stop 49 to engage and limit the movement of the roller 45.

This cam arm must of course be accurately made and mounted. A preferred way of mounting it is to provide it with a trunnion 50 on the under side which seats in a journal 51 on the under side of the base 10. The trunnion 50 is grooved as shown at 52 to receive a bolt 53 which extends across a split portion 54 of the journal bearing 51, and thus the bolt serves to clamp the journal upon the trunnion and also hold the trunnion so that it can turn but cannot be accidentally removed from its bearing. The journal ring 51 is rigid on the base 10 and on the side next the bolt 53 is transversely cut to the point 55 indicated by dotted lines in Fig. 5 and shown clearly in full lines in Fig. 2. This is an ordinary expedient and is done simply to make the ring 55 sufficiently flexible so that it can be tightened or loosened by the bolt 53 and its nut.

In operating the instrument the operator looks through the sight 13 and clear part of the mirror 14 to the object desired, and the distance of which it is desired to measure. He then moves the cam arm 46 and this causes the arm 39 to tilt on the stud 43 and pull on the spring 35, and imparts a corresponding movement to the lever 26 which turns on its hinged joint and tilts the mirror 20. By adjusting the cam arm back and forth it can be moved to the point where the image reflected from the mirror 20 will exactly coincide with the object viewed directly through the clear mirror 15, and when this occurs, the position of the cam arm on the scale of the table 11 will indicate the distance.

It will be seen that the instrument is extremely simple and easy to operate, and that it can be made of such strong construction that there will be no danger of its parts becoming seriously disarranged or impaired, and further that the instrument can be made of a size to measure any reasonable distance desired.

Attention is called to the adjustable connection between the members 26 and 39 by means of the spring or leaf 35. It will be understood that the proper relation of the mirrors 14 and 20 must be maintained, and that they should be essentially parallel when the pin 45 is at the position of maximum distance on the cam 46. If, now, in use one or both of the members 26 and 39 becomes bent or distorted, the proper relation of the mirrors can still be maintained and very easily determined, by simply adjusting the length of the member 35 or the position of the member 21 on the lever 26.

I claim:—

1. A range finder comprising a sight, a mirror partly clear and partly opaque in alinement with the sight, a second mirror arranged to cast a reflected image upon the first mirror, a lever supporting the second mirror, a swinging arm generally parallel with a lever, a flexible connection between the swinging arm and the lever, and a cam arm arranged to actuate the aforesaid swinging arm.

2. A range finder comprising a base, a sight on the base, a mirror partly opaque and partly clear in alinement with the sight, a lever lying upon the base, a second mirror movable on the lever and arranged to cast a reflected image upon the first mirror, a swinging arm having an eccentric connection with the lever, an adjustable element connecting the swinging arm with the lever, and a cam arm arranged to actuate the aforesaid arm and movable over a table on the base.

3. A range finder comprising a base, a sight thereon, a mirror partly opaque and partly clear alining with the sight, a lever lying flatwise on the base, said lever having a hinge at one end formed by a flat spring connecting the end of the lever with a support, a second mirror mounted on the lever and arranged to cast a reflected image upon the first mirror, a cam arm movable over a table on the base, and a connection between the cam arm and lever whereby the moving of the arm moves the lever.

4. In a range finder, the combination with the mirror partly clear and partly opaque, and a sight for the mirror, of the lever lying at essentially right angles to the line between the sight and the aforesaid mirror, a flat spring connecting one end of the lever with a support and forming a hinge, a cam arm movable over a table, and an operative connection between the cam arm and the lever whereby the movement of the arm moves the lever.

5. A range finder having a fixed sight mirror, a lever arranged at essentially right angles to the sight line of the aforesaid mirror, a second mirror mounted on the lever and arranged to cast a reflected image upon the first mirror, a swinging arm having an eccentric connection with the aforesaid lever, a cam arm turning upon a table, and a sliding connection between the aforesaid arm and the cam arm.

6. A range finder comprising a sight mirror, a lever extending at generally right angles to the line of sight through the aforesaid mirror, a flat spring connected with one end of the lever and with a support and forming a hinge for the lever, a second mirror supported on the lever and arranged to reflect an image upon the first mirror, a spring to hold the lever under tension, a swinging arm having an eccentric connection with the lever, and a cam arm moving over a table and arranged to actuate the aforesaid arm.

7. A range finder comprising a flat base having one part formed into a table, a sight mirror partly clear and partly opaque at one end of the table, a lever lying flatwise upon the base, a second mirror supported on the lever and arranged to reflect an image upon the first mirror, a swinging arm lying flatwise on the base, an eccentric connection between the swinging arm and the lever, a keeper beneath which the swinging arm moves, and a cam arm pivoted on the aforesaid table and operatively connected with the aforesaid arm to move it.

8. A range finder comprising a flat base having one part formed into a table, a sight mirror partly clear and partly opaque at one end of the base, a lever lying flatwise upon the base, a second mirror supported on the lever and arranged to reflect an image upon the first mirror, a swinging arm lying generally parallel with the aforesaid lever, an eccentric connection between the swinging arm and the lever, said connection being by means of a flat spring, and a cam arm pivoted on the table and operatively connected with the said swinging arm to move it.

ABRAHAM B. COX.

Witnesses:
WARREN B. HUTCHINSON,
M. G. O'DONNELL.

Copies of this patent may be obtained for five cents each, by addressing the "Commissioner of Patents, Washington, D. C."